Aug. 17, 1965  E. G. CHAGGARIS  3,200,652
BEARING RACE COUNTER ROTATION APPARATUS FOR GYROS
Filed Dec. 19, 1960  6 Sheets-Sheet 1

ELIAS G. CHAGGARIS
INVENTOR.

BY Andrew L. Bain
ATTORNEYS

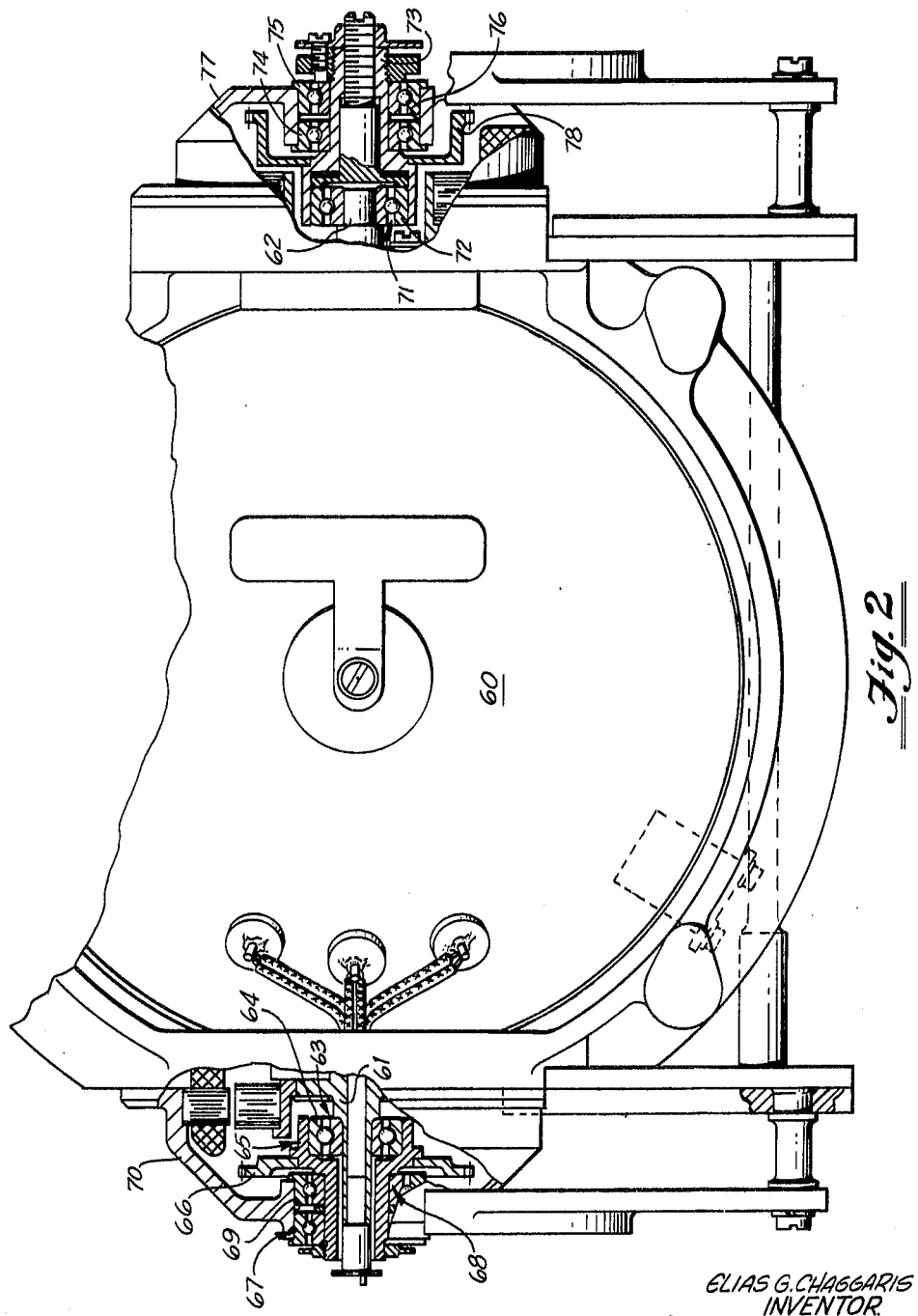

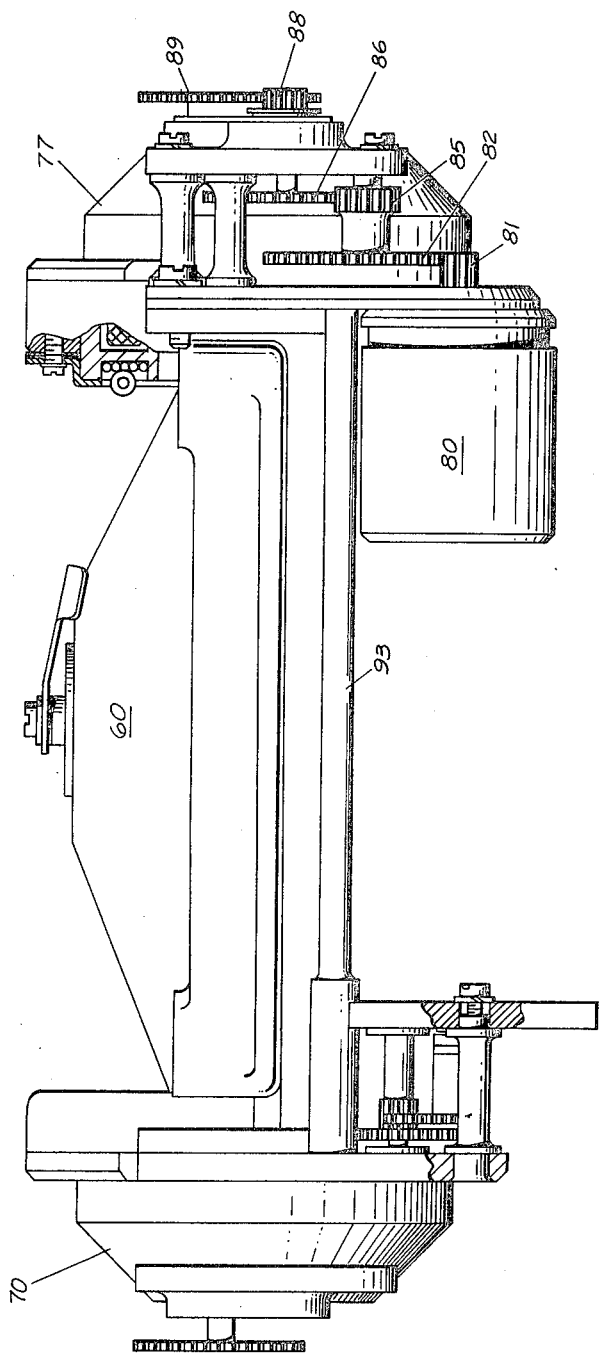

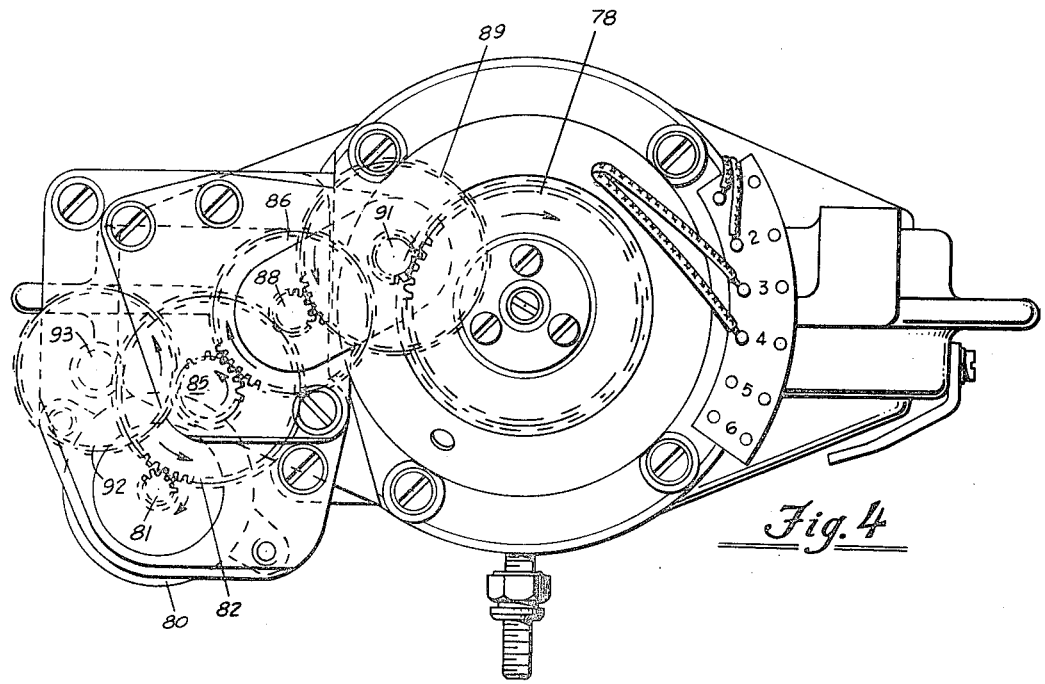
Fig. 4
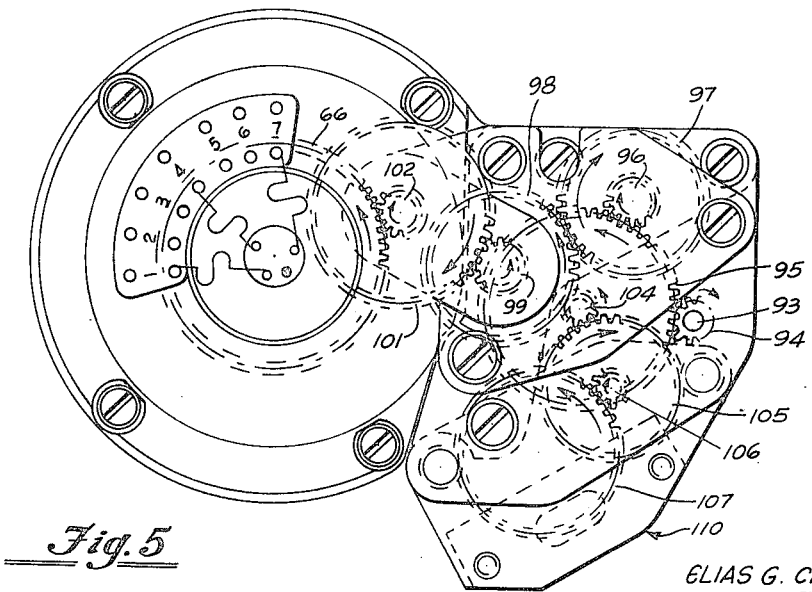
Fig. 5
ELIAS G. CHAGGARIS
INVENTOR.
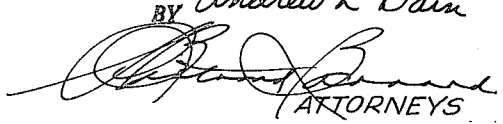
ATTORNEYS

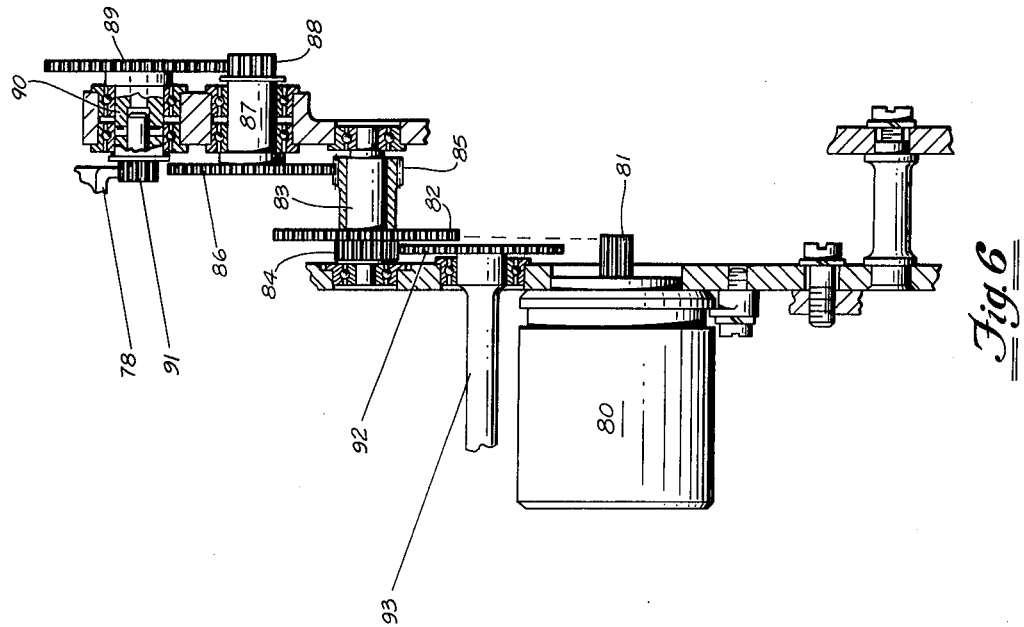
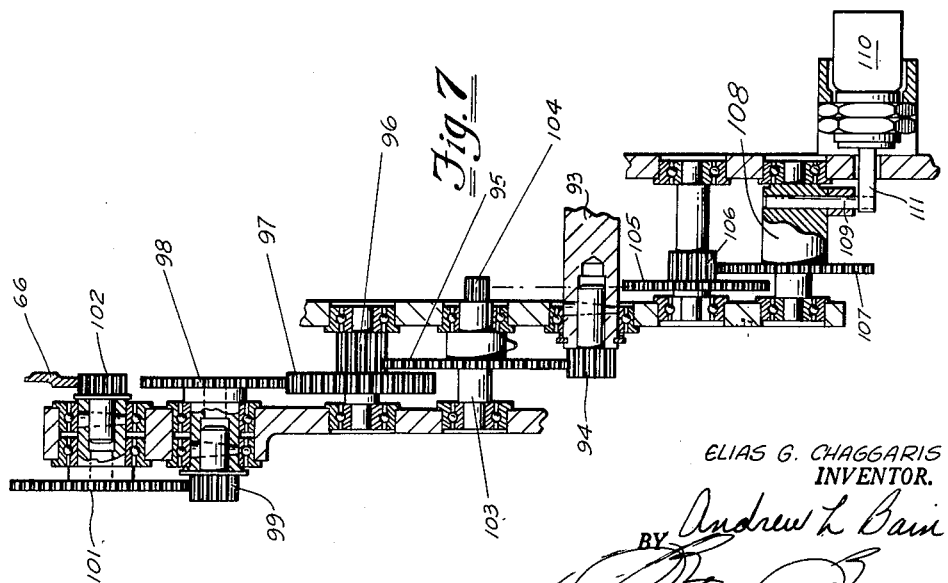

United States Patent Office 3,200,652
Patented Aug. 17, 1965

3,200,652
BEARING RACE COUNTER ROTATION
APPARATUS FOR GYROS
Elias G. Chaggaris, Dover, N.J., assignor to General Precision Inc., Little Falls, N.J., a corporation of Delaware
Filed Dec. 19, 1960, Ser. No. 76,712
14 Claims. (Cl. 74—5)

The present invention relates to gyroscopic apparatus, and more particularly to such apparatus in which the inner or outer races of the bearings of the gyroscope are oppositely oscillated.

In gyroscopic apparatus, it has been found that certain errors arise in the apparatus due to radial bearing friction, which occurs in the bearings which support oppositely extending shafts of the gyroscope apparatus. While in some installations it is necessary to provide gyroscopes of extremely high accuracy, in other installations such high accuracy, and expensive gyroscopes are not required, but there is nevertheless a desire that such gyroscopes be made more accurate than heretofore.

To that end, and generally speaking, the present invention provides an apparatus which averages out the radial friction of the shaft bearings by causing oscillation of the inner or outer races of the bearings for the shafts, in opposite directions.

An object of the present invention is to provide a gyroscope apparatus in which radial bearing friction in the gyroscope shaft bearings is reduced to a minimum.

Another object of the present invention is the provision of gyroscope apparatus in which the inner or outer races of the gyroscope bearings are rotated or oscillated.

A further object of the present invention is to provide gyroscope apparatus in which the inner or outer races of the gyroscope shaft bearings are oppositely oscillated.

Yet another object of the present invention is the provision of a gyroscope apparatus in which there is provided a sturdy support for shaft bearing outer race rotating members.

A further object of the present invention is to provide a gyroscope apparatus in which the gyroscope shaft bearing outer races are oppositely rotated from a motor having a single output shaft.

A still further object of the present invention is the provision of a gyroscope apparatus in which the gyroscope shaft bearing inner or outer races are oppositely rotated from a motor having dual output shafts.

Other objects and the nature and advantages of the present invention will be apparent from the following description taken in conjunction with the accompanying drawings, wherein:

FIGURE 2 is a plan view and partial longitudinal section of another embodiment of the present invention, in which a motor having a single output shaft is utilized.

FIGURE 3 is a front elevational view gyroscope apparatus of FIGURE 2.

FIGURE 4 is an end elevational view showing the right side of the apparatus of FIGURES 2 and 3.

FIGURE 5 is an end elevational view showing the left side of the apparatus of FIGURES 2 and 3.

FIGURE 6 is a linear representation of the gear train mechanism shown in FIGURE 4.

FIGURE 7 is a linear representation of the gear train mechanism shown in FIGURE 5.

Figure 1A:
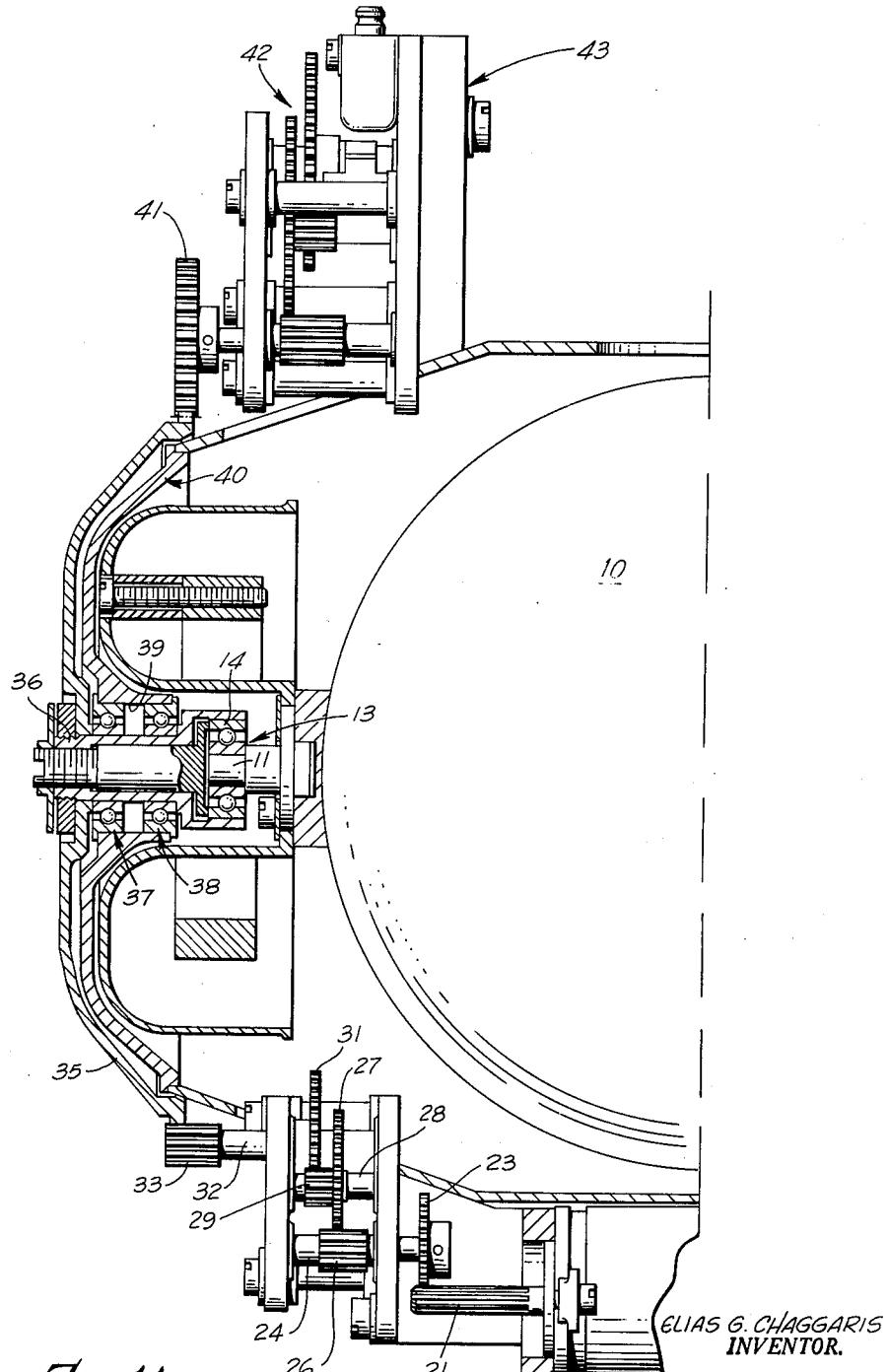
FIGURES 1A and 1B are respectively partial cross-sectional views of the inner gimbal of a gyroscopic apparatus in accordance with the present invention and utilizing a motor having dual output shafts.
Figure 1B:
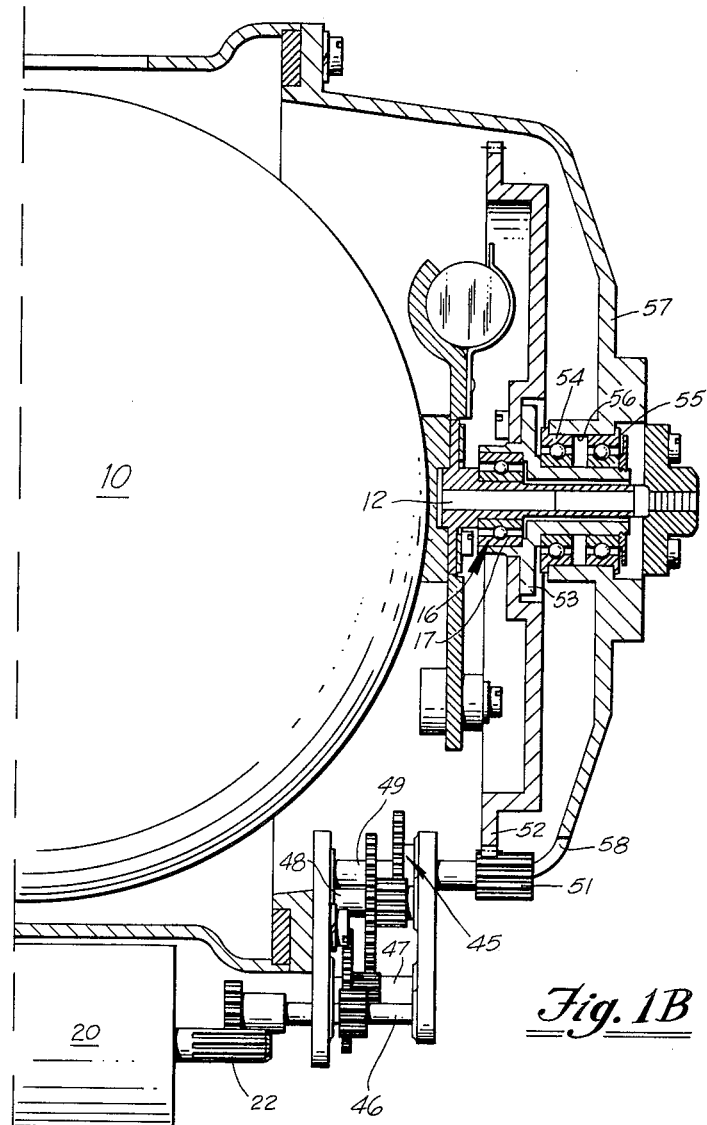

Referring now to the drawings, wherein like reference numerals are used to designate like or corresponding parts throughout the several views, there is shown in FIGURE 1A and FIGURE 1B the inner gimbal of a gyroscope apparatus generally designated 10 the inner gimbal having oppositely extending shafts 11 and 12. The inner portion of shaft 11 is supported by an anti-friction bearing 13 having an outer race 14. Similarly, the inner portion of shaft 12 is supported by an anti-friction bearing 16 having an outer race 17.

In order to drive the outer races 14 and 17, there is provided an electric motor 20 having oppositely extending pinion shafts 21 and 22. Shaft 21 is in engagement with a gear 23 carried by a shaft 24 which also has on it a pinion 26. Pinion 26 is in engagement with a gear 27 on a shaft 28, the shaft 28 having thereon a pinion 29 which is in engagement with a gear 31. Gear 31 is on shaft 32 carrying at its outer end a pinion 33 which is in engagement with a ring gear 35. Ring gear 35 is supported by a hollow shaft 36 which is carried by the bearings 37 and 38 which are in turn supported in an opening 39 in the end housing member 40. At its inner end, hollow shaft 36 receives in a press fit relationship the outer race 14 of bearing 13.

Ring gear 35, which will be seen to be outwardly of housing 40, is in driving relationship with a gear 41 which serves to drive a gear train generally designated 42 that serves to actuate a switching mechanism of any desired type and generally designated 43.

Referring now to FIGURE 1B, the splined shaft 22 of motor 20 drives a gear trains generally designated 45, and comprising the shafts 46, 47, 48 and 49, shaft 49 having a pinion 51 which is in engagement with a ring gear 52. It will be noted that the gear train driven by the pinion shaft 21 has three shafts, whereas the gear train driven by pinion shaft 22 has four shafts, so that, as will be readily understood, the ring gears 35 and 52 are driven in opposite directions.

Ring gear 52 is connected with a hollow shaft 53 which is carried in bearings 54 and 55 which are supported in an opening 56 in a housing 57, the opening 56 being in axial alignment with the shaft 12 and comprising a central opening. The end housing 57 also has a side opening 58, and it is through this side opening 58 that the pinion 51 and ring gear 52 engage.

The hollow shaft 53 carries at its inner end the outer race 17 of bearing 16.

In operation, motor 20 will be energized to thereby rotate the shafts 21 and 22 to thereby rotate the ring gears 35 and 52 in opposite directions, as was mentioned above. The ring gear 35 will in turn rotate the shaft 36, and rotation of shaft 36 will in turn cause the outer race 14 of bearing 13 to rotate. Similarly, rotation of ring gear 52 will cause the hollow shaft 53 to rotate, and this will in turn rotate the outer race 17 of bearing 16. Rotation of ring gear 35 will also cause rotation of the members of gear train 42, so that the switch mechanism 43 will be actuated after a predetermined amount of rotation of the shafts 21 and 22. At this time, the switching mechanism 43 will be actuated, in known manner, and will cause the motor 20 to reverse its direction, the connection to the motor 20 being of any suitable type known to the art. Reversal of motor 20 will cause the ring gears 35 and 52 to rotate in opposite directions, and this opposite direction of rotation of the ring gears 35 and 52 will continue until such time as the switch mechanism 43 is again actuated to thereby cause the motor 20 to rotate in the first mentioned direction. By this arrangement, therefore, the outer races 14 and 17 will be caused to oscillate back and forth, and each will be rotating in a direction opposite to that of the other.

Referring now to FIGURE 2, there may be seen a gyroscope apparatus generally designated 60 having at one end a shaft 61 and at the other end a shaft 62. Shaft 61 is carried in a bearing 63, having an outer race 64 which is supported by the inner end of a hollow shaft 65. Shaft 65 has thereon a ring gear 66 and is supported by bearings 67 and 68 carried in an opening 69 in an end housing 70. Similarly, the shaft 62 is carried in a bearing 71, the bearing 71 having an outer race 72 that is supported in the inner end of a hollow shaft 73. A pair of bearings 74 and 75 support the shaft 73 and are in turn carried in an opening 76 in an end housing 77. The shaft 73 has connected to it a ring gear 78.

The ring gears 66 and 78 are driven from a motor 80 having a single pinion output shaft 81. This shaft is in engagement with a gear 82, as may be seen in FIGURES 3, 4 and as will be understood from the dashed line connection in FIGURE 6 between pinion shaft 81 and gear 82. Referring now to FIGURE 6, gear 82 is on a shaft 83 having pinions 84 and 85 near the ends thereof. Pinion 85 drives gear 86 which is on shaft 87 having thereon a pinion 88 that in turn drives the gear 89. Gear 89 is carried on a tubular shaft 90, which has thereon the pinion 91 which serves to drive the ring gear 78. The pinion 91 is integral with the outer end of a stub shaft which is fitted to the inner diameter of the tubular shaft 90 and pinned thereto.

The pinion 84 serves to drive gear 92 on transfer shaft 93. Transfer shaft 93 has on its other end, as shown in FIGURE 7, a pinion 94 which drives in turn the gear 95. Gear 95, drives a pinion 96 and a gear 97, co-axial with pinion 96, gear 97 driving a gear 98, and a pinion 99, attached to the gear 98, the pinion 99 in turn driving a gear 101, and a pinion 102 fixedly attached to the gear 101. The pinion 94 is integral with a stub shaft, which is fitted to the central cavity of the shaft 93. Pinion gear 102 is in engagement with the ring gear 66, shown in FIGURE 2.

Gear 95, which is driven by pinion 94 is on a shaft 103 having on the inner end thereof a pinion 104 which is in engagement with a gear 105, as is indicated by the dashed line in FIGURE 7. The gear 105 drives, through the pinion 106 and the gear 107, a shaft 108 having thereon an extending finger 109. Finger 109 moves through a path intersected by a switch lever 111 of the switch 110.

As will be apparent, the drive from motor 80 will cause the rotation of the gears shown in FIGURE 6 to thereby drive ring gear 78 and with it the hollow shaft 73 and the outer race 72 of bearing 71. Similarly, actuation of the motor 80 will drive the transfer shaft 93 which will in turn drive the ring gear 66 to thereby cause rotation of the hollow shaft 65 and outer race 64 of bearing 63. There will also be driven, from transfer shaft 93, the pinion 104, so as to cause the shaft 108 to rotate, and carry with it the finger 109. As the above described parts rotate, the finger 109 will engage with the switch lever 111 and throw switch 110. Through a suitable connection, switch 110 will cause the motor 80 to reverse, and thereby reverse the direction of rotation of the various gears and the bearing outer races 64 and 72. And because the ring gear 78 is driven through three counter-shafts, whereas ring gear 66 is driven through six counter-shafts, as will be understood from the above, the ring gears 78 and 66 will rotate in opposite directions so that there will thereby be effected an opposite oscillation of the rotor races of the bearings.

There has been provided gyroscopic apparatus in which oppositely extending shafts of inner gimbal of the apparatus are carried in bearings of the anti-friction type, which bearings have outer races which are caused to oscillate in opposite directions. The shafts which cause rotation of the outer races of the bearings are firmly supported in suitable bearings.

Further, the above described apparatus permits the utilization of a single motor having dual output shafts, as in the embodiment of FIGURES 1A and 1B, or permits the utilization of a motor having a single output shaft, in combination with a transfer shaft, as in the embodiment of the invention shown in FIGURES 2 to 7.

It will be obvious to those skilled in the art that various changes may be made without departing from the spirit of the invention and therefore the invention is not limited to what is shown in the drawings and described in the specification but only as indicated in the appended claims.

What is claimed is:

1. In a gyroscope apparatus including a gimbal, shafts for supporting the gimbal of a gyroscope, rotary anti-friction bearings for supporting said shafts and comprising inner and outer races, and means for oscillating said outer races in opposite directions comprising a motor having oppositely extending spur pinion shafts, a pair of spur gear train means, each operatively connected with one of said spur pinion shafts, a first housing member having an opening therethrough, bearing means in said opening and supporting a hollow shaft, a spur ring gear outwardly of said housing member connected with said hollow shaft and in engagement with one said spur gear train means, said hollow shaft at the inner end thereof supporting the outer race of one said rotary anti-friction bearing, a second housing member having a central opening in alignment with said gyroscope gimbal shafts, bearing means in said last mentioned opening supporting a hollow shaft, said second housing having an opening in the side there, a spur ring gear located adjacent said housing and connected with said second hollow shaft, said spur ring gear being in engagement with said second spur gear train means through said side opening through the housing, said second hollow shaft at the inner end thereof supporting the outer race of the other said rotary anti-friction bearing, third spur gear train means in engagement with said first mentioned spur ring gear and in driving relation with switch means for the motor, the number of shafts in one of said spur gear train means being an even number, and the number of shafts in the other of said spur gear train means being an odd number.

2. In a gyroscope apparatus including a gimbal, oppositely extending shafts for supporting the gimbal of a gyroscope, rotary anti-friction bearings for supporting said shafts and comprising inner and outer races, and means for oscillating said outer races in opposite directions comprising a motor having oppositely extending spur gear toothed shafts, a pair of spur gear train means each operatively connected with one of said spur gear toothed shafts, a first housing member having an opening therethrough, bearing means in said opening and supporting a hollow shaft, a spur ring gear outwardly of said housing member connected with said hollow shaft and in engagement with one said spur gear train means, said hollow shaft at the inner end thereof supporting the outer race of one said rotary anti-friction bearing, a second housing member having a central opening in alignment with said gyroscope gimbal shafts, bearing means in said last mentioned opening supporting a hollow shaft, said second housing having an opening in the side thereof, a spur ring gear within said housing and connected with said second hollow shaft, said spur ring gear being in engagement with said second spur gear train through said side opening, said second hollow shaft at the inner end thereof supporting the outer race of the other said rotary anti-friction bearing, and means for periodically reversing said motor.

3. In a gyroscope apparatus including a gimbal, oppositely extending shafts for supporting the gimbal of a gyroscope, rotary anti-friction bearings for supporting said drafts and comprising inner and outer races, and means for oscillating said outer races in opposite directions comprising a motor having oppositely extending toothed shafts, a pair of spur gear train means, each operatively connected with one of said toothed shafts, a hollow shaft, means for rotatably supporting the hollow shaft, a spur ring gear connected with said hollow shaft, and in engagement with one of said spur gear train means, said hollow shaft at the inner end thereof supporting the outer race of one said rotary anti-friction bearing, a housing member having a central opening in alignment with said gyroscope gimbal shafts, bearing means in said last mentioned opening supporting a hollow shaft, said housing having an opening in the side thereof, a spur ring gear within said housing and connected with said second hollow shaft, said spur ring gear being in engagement with said second spur gear train means through said side opening, said second hollow shaft at the inner end thereof supporting the outer race of the other said rotary anti-friction bearing.

4. In a gyroscope apparatus including a gimbal, oppositely extending shafts for supporting the gimbal of a gyroscope, rotary anti-friction bearings for supporting said shafts and comprising inner and outer races, and means for oscillating said outer races in opposite directions comprising a motor having oppositely extending shafts, a pair of spur gear train means, each operatively connected with one of said shafts, a first housing member having an opening therethrough, bearing means in said opening and supporting a hollow shaft, a spur ring gear outwardly of said first housing member connected with said hollow shaft and in engagement with one said spur gear train means, said hollow shaft at the inner end thereof supporting the outer race of one said rotary anti-friction bearing, a second hollow shaft, bearing means for supporting said second hollow shaft, a spur ring gear connected with said second hollow shaft and in engagement with said second spur gear train, said second hollow shaft at the inner end thereof supporting the outer race of the other said rotary anti-friction bearing.

5. In a gyroscope apparatus including a gimbal, oppositely extending shafts for supporting the gimbal of a gyroscope, rotary anti-friction bearings for supporting said shafts and comprising inner and outer races, and means for oscillating said outer races in opposite directions comprising a motor having oppositely extending toothed shafts, a pair of spur gear train means, each operatively connected with one of said toothed shafts, a hollow shaft, means for rotatably supporting the hollow shaft, a spur ring gear connected with the said hollow shaft, and in driving engagement with one said spur gear train means, said hollow shaft at the inner end thereof supporting the outer race of one said rotary anti-friction bearing, a second hollow shaft, bearing means for supporting said second hollow shaft, a spur ring gear connected with said second hollow shaft and in engagement with said second spur gear train means, said second hollow shaft at the inner end thereof supporting the outer race of the other side rotary anti-friction bearing.

6. In a gyroscope apparatus including a gimbal, oppositely extending shafts for supporting the gimbal of a gyroscope, rotary anti-friction bearings for supporting said shafts and comprising inner and outer races, and means for oscillating said outer races in opposite directions comprising a motor having oppositely extending shafts, a pair of spur gear train means having respectively an odd and an even number of shafts, each said spur gear train means being operatively connected with a respective one of said motor shafts, respective shaft means connected with each of said outer races, bearing means for supporting said shaft means, gear means on said shaft means connecting each shaft means to a respective one of said spur gear train means, reversing switch means for said motor, and third spur gear train means driven from said motor and drivingly connected to operate said reversing switch means.

7. In a gyroscope apparatus including a gimbal, oppositely extending shafts for supporting the gimbal of a gyroscope, rotary anti-friction bearings for supporting said shafts and comprising inner and outer races, and means for oscillating said outer races in opposite directions comprising a motor having a shaft, a pair of spur gear train means, one said spur gear train means being operatively connected with said motor shaft, means including a transfer shaft for driving said second spur gear train means from said first spur gear train means, the axis of rotation of the transfer shaft being substantially parallel to the axis of rotation of the motor shaft, a first housing member having an opening therethrough, bearing means in said opening and supporting a hollow shaft, a spur ring gear in said housing member connected with said hollow shaft and in engagement with one said spur gear train means, the axis of rotation of the spur gear being substantially parallel to the axis of rotation of the transfer shaft, said hollow shaft at the inner end thereof supporting the outer race of one said rotary anti-friction bearing, a second housing member having a central opening in alignment with said gyroscope gimbal shafts, bearing means in said last mentioned opening supporting a second hollow shaft, a spur ring gear within said second housing member and connected with said second hollow shaft, the axis of rotation of the spur ring gear connected to the second hollow shaft being substantially parallel to the axis of rotation of the transfer shaft, said spur ring gear being in engagement with said second spur gear train means, said second hollow shaft at the inner end thereof supporting the outer race of the other said rotary anti-friction bearing, third spur gear train means in engagement with said second spur gear train means and driving a shaft having a radially extending finger, and switch means for said motor having a lever in engagement with said finger.

8. In a gyroscope apparatus including a gimbal, oppositely extending shafts for supporting the gimbal of a gyroscope, rotary anti-friction bearings for supporting said shafts and comprising inner and outer races, and means for oscillating said outer races in opposite directions comprising a motor having a shaft, a pair of spur gear train means, one said spur gear train means being operatively connected with said motor shaft, means including a transfer shaft for driving said second spur gear train means from said first spur gear train means, the axis of rotation of the transfer shaft being substantially parallel to the axis of rotation of the motor shaft, a first housing member having an opening therethrough, bearing means in said opening and supporting a hollow shaft, a spur ring gear in said housing member connected with said hollow shaft and in engagement with one said spur gear train means, the axis of rotation of the spur ring gear being substantially parallel to the axis of rotation of the transfer shaft, said hollow shaft at the inner end thereof supporting the outer race of one said rotary anti-friction bearing, a second housing member having a central opening in alignment with said gyroscope gimbal shafts, bearing means in said last mentioned opening supporting a second hollow shaft, a spur ring gear within said second housing member and connected with said second hollow shaft, the axis of rotation of the spur ring gear connected to the second hollow shaft being substantially parallel to the axis of rotation of the transfer shaft, said ring gear being in engagement with said second spur gear train means, said second hollow shaft at the inner end thereof supporting the outer race of the other said rotary anti-friction bearing.

9. In a gyroscope apparatus including a gimbal, oppositely extending shafts for supporting the gimbal of a gyroscope, rotary anti-friction bearings for supporting said shafts and comprising inner and outer races, and means for oscillating said outer races in opposite directions comprising a motor having a shaft, a pair of spur gear train means, one said spur gear train means being operatively connected with said motor shaft, means including a transfer shaft for driving said second spur gear train means from said first spur gear train means, the axis of rotation of the transfer shaft being substantially parallel to the axis of rotation of the motor shaft, a first housing member having an opening therethrough, bearing means in said opening and supporting a hollow shaft, a spur ring gear in said housing member connected with said hollow shaft and in engagement with one said spur gear train means, the axis of rotation of the spur ring gear being substantially parallel to the axis of rotation of the transfer shaft, said hollow shaft at the inner end thereof supporting the outer race of one said rotary anti-friction bearing, a second housing member having a central opening in alignment with said gyroscope gimbal shafts, bearing means in said last mentioned opening supporting a second hollow shaft, a spur ring gear within said housing and connected with said second hollow shaft, the axis of rotation of the spur ring gear connected to the second hollow shaft being substantially parallel to the axis of rotation of the transfer shaft, said spur ring gear being in engagement with said second spur gear train means, said second hollow shaft at the inner end thereof supporting the outer race of the other said rotary anti-friction bearing, one said spur gear train means having an even number of shafts and the other said spur gear train means having an odd number of shafts.

10. In a gyroscope apparatus including a gimbal, oppositely extending shafts for supporting the gimbal of a gyroscope, rotary anti-friction bearings for supporting said shafts and comprising inner and outer races, and means for oscillating said outer races in opposite directions comprising a motor having a shaft, a pair of spur gear train means, one said spur gear train means being operatively connected with said motor shaft, means including a transfer shaft for driving said second spur gear train means from said first spur gear train means, the axis of rotation of the transfer shaft being substantially parallel to the axis of rotation of the motor shaft, a hollow shaft, bearing means for supporting said hollow shaft, a spur ring gear connected with said hollow shaft and in engagement with one said spur gear train means, the axis of rotation of the spur ring gear being substantially parallel to the axis of rotation of the transfer shaft, said hollow shaft at the inner end thereof supporting the outer race of one said rotary antifriction bearing, a second hollow shaft, bearing means supporting said second hollow shaft, a spur ring gear connected with said second hollow shaft, the axis of rotation of the spur ring gear connected to the second hollow shaft being substantially parallel to the axis of rotation of the transfer shaft, said spur ring gear being in engagement with said second spur gear train means, said second hollow shaft at the inner end thereof supporting the outer race of the other said rotary anti-friction bearing, third spur gear train means in engagement with said second spur gear train means, and in driving relation with switch means for the motor.

11. In a gyroscope apparatus including a gimbal, oppositely extending shafts for supporting the gimbal of a gyroscope, rotary anti-friction bearings for supporting said shafts and comprising inner and outer races, and means for oscillating said outer races in opposite directions comprising a motor having a shaft, a pair of spur gear train means, one said spur gear train means being operatively connected with said motor shaft, means including a transfer shaft for driving said second spur gear train means from said first spur gear train means, the axis of rotation of the transfer shaft being substantially parallel to the axis of rotation of the motor shaft, a hollow shaft, individually supporting the outer race of each of said bearings, first and second rotatable means each connected with the hollow shaft supporting the outer race of one of said bearings, means connecting each said rotatable means with one said spur gear train means, third spur gear train means in engagement with said second spur gear train means and driving a shaft having a radially extending finger, and switch means for said motor having a lever in engagement with said extending finger.

12. In a gyroscope apparatus including a gimbal, oppositely extending shafts for supporting the gimbal of a gyroscope, rotary anti-friction bearings for supporting said shafts and comprising inner and outer races, and means for oscillating said outer races in opposite directions comprising a motor having a shaft, a pair of spur gear train means, one said spur gear train means being operatively connected with said motor shaft, means including a transfer shaft for driving said second spur gear train means from said first spur gear train means, the axis of rotation of the transfer shaft being substantially parallel to the axis of the rotation of the motor shaft, a hollow shaft individually supporting the outer race of each of said bearings, first and second rotatable means each connected with the hollow shaft supporting the outer race of one of said bearings, and means connecting each said rotatable means with one said spur gear train means.

13. In a gyroscope apparatus including a gimbal, oppositively extending shafts for supporting the gimbal of a gyroscope, rotary anti-friction bearings for supporting said shafts and comprising inner and outer races, and means for oscillating said outer races in opposite directions comprising a motor, a pair of spur gear train means, each operatively connected with said motor shaft, a first housing member having an opening therethrough, bearing means in said opening and supporting a hollow shaft, a spur ring gear connected with said hollow shaft and in engagement with one said spur gear train means, said hollow shaft at the inner end thereof supporting the outer race of one said rotary anti-friction bearing, a second housing member having an opening, bearing means in said last mentioned opening supporting a second hollow shaft, a spur ring gear connected with and engaging said second hollow shaft, said spur ring gear being in engagement with said second spur gear train means, said second hollow shaft at the inner end thereof, supporting the outer race of the other said rotary anti-friction bearing, and third spur gear train means driven from said motor and in driving relation with switch means for the motor.

14. In a gyroscope apparatus including a gimbal, oppositely extending shafts for supporting the gimbal of gyroscope, rotary anti-friction bearings for supporting said shafts and comprising inner and outer races, a hollow shaft individually supporting the outer race of each of said anti-friction bearings, bearing means for supporting said hollow shaft, first and second rotatable means each connected with the hollow shaft supporting the outer race of one of said bearings, and means for oscillating said rotatable means in opposite directions comprising a motor, individual spur gear train means connecting said motor with each of said first and second rotatable means for rotating said first and second rotatable means in opposite directions, and means for periodically reversing the direction of rotation of said motor.

References Cited by the Examiner

UNITED STATES PATENTS

| | | | |
|---|---|---|---|
| 2,437,789 | 3/48 | Robins | 170—135.28 X |
| 2,552,864 | 5/51 | Piasecki. | |
| 2,970,480 | 2/61 | Zeigler et al. | 308—183 X |

BROUGHTON G. DURHAM, *Primary Examiner.*

RICHARD A. DOUGLASS, *Examiner.*